United States Patent [19]

Marello et al.

[11] Patent Number: 4,936,367

[45] Date of Patent: Jun. 26, 1990

[54] SYSTEM FOR SECURING AN ARTICULATED ASSEMBLY OF ELEMENTS ON A SPACECRAFT

[75] Inventors: Georges Marello, Mandelieu; Jacques Auternaud, Mougins, both of France

[73] Assignee: Aerospatiale Societe Nationale Industrielle, Paris, France

[21] Appl. No.: 313,064

[22] Filed: Feb. 22, 1989

[30] Foreign Application Priority Data

Feb. 23, 1988 [FR] France .................................. 8802147

[51] Int. Cl.⁵ .............................................. B64G 1/44
[52] U.S. Cl. ........................................ 160/1; 244/173; 136/245
[58] Field of Search ............. 244/173, 158 R; 410/31, 410/32, 33, 34, 38; 136/245; 160/1, 2, 84.1

[56] References Cited

U.S. PATENT DOCUMENTS

| | | | |
|---|---|---|---|
| 3,477,662 | 11/1969 | Anderson | 244/173 |
| 3,532,299 | 10/1970 | Williamson et al. | 244/173 |
| 3,733,758 | 5/1973 | Maier et al. | 244/173 |
| 4,347,023 | 8/1982 | Rizos | 244/173 |
| 4,641,798 | 2/1987 | De Haan et al. | 244/173 |
| 4,725,025 | 2/1988 | Binge et al. | 244/173 |
| 4,779,826 | 10/1988 | Kiendl | 244/173 |

FOREIGN PATENT DOCUMENTS

| | | | |
|---|---|---|---|
| 0151505 | 6/1985 | European Pat. Off. | 244/173 |
| 3106099 | 4/1982 | Fed. Rep. of Germany | 244/173 |
| 2598383 | 5/1987 | France | 244/173 |

Primary Examiner—Charles T. Jordan
Assistant Examiner—Michael J. Carone
Attorney, Agent, or Firm—Fisher, Christen & Sabol

[57] ABSTRACT

A system for securing deployable elements, such as solar panels, on a structure, such as a spacecraft, with the aid of a through rod. A mechanism is provided for releasing the through rod from the elements at the moment of deployment thereof, then for returning the rod into its initial position with respect to the outer element.

10 Claims, 2 Drawing Sheets

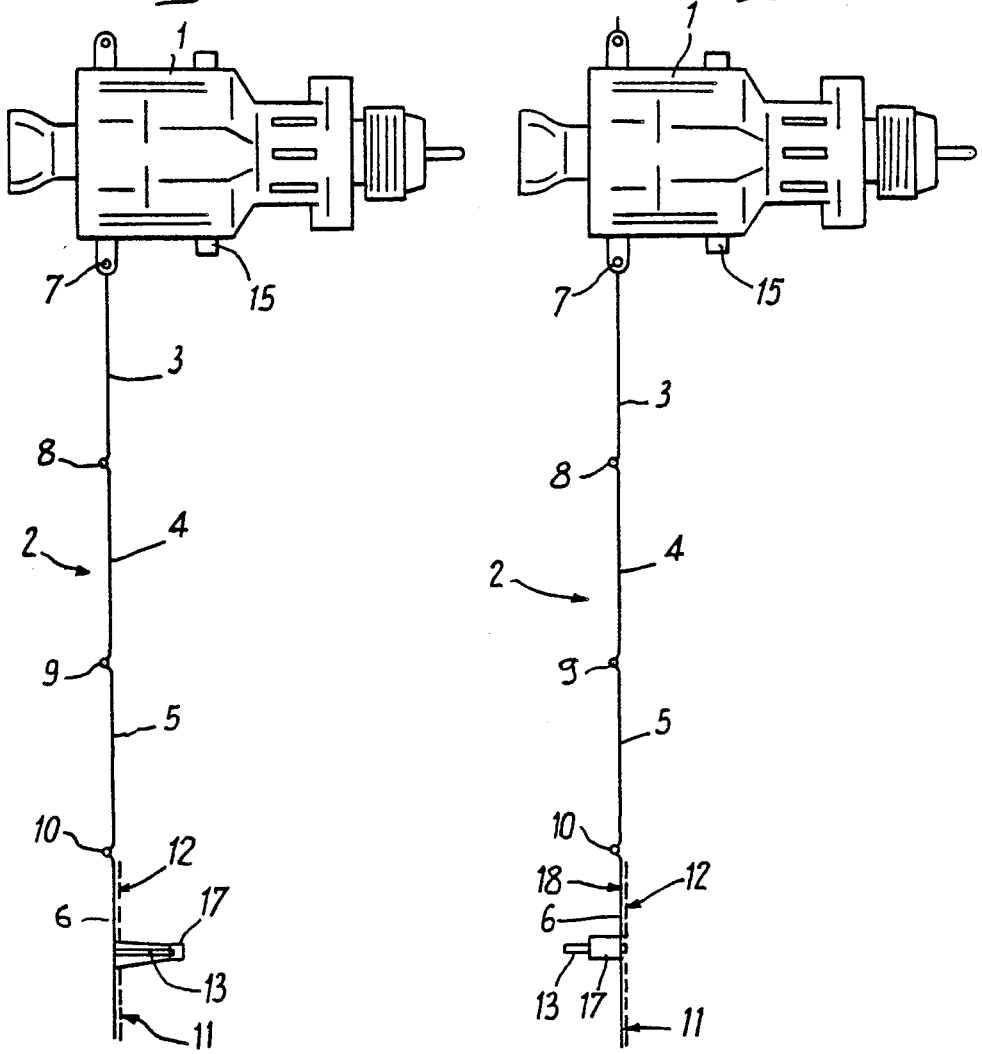

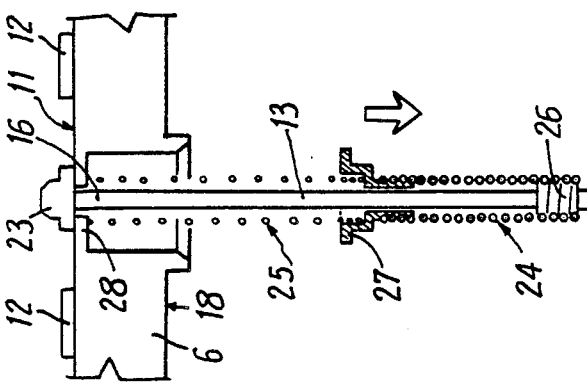
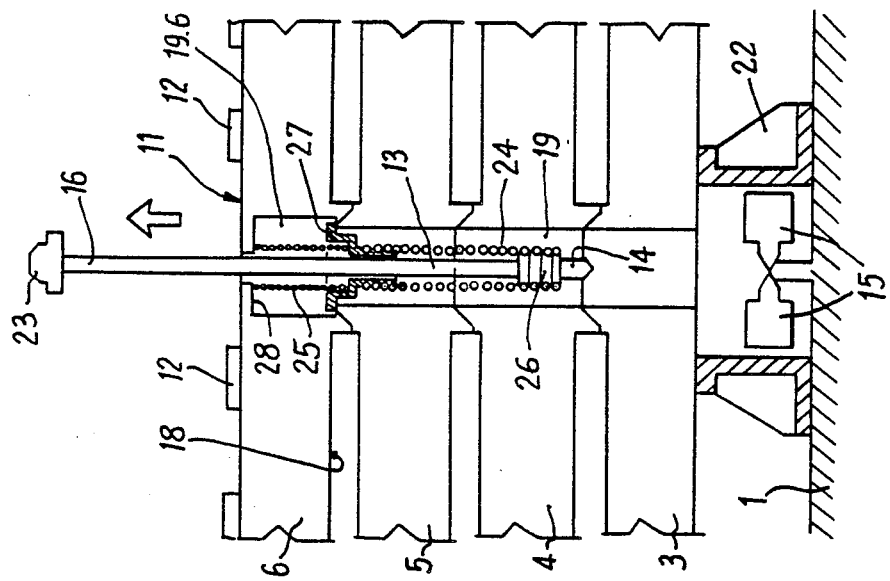
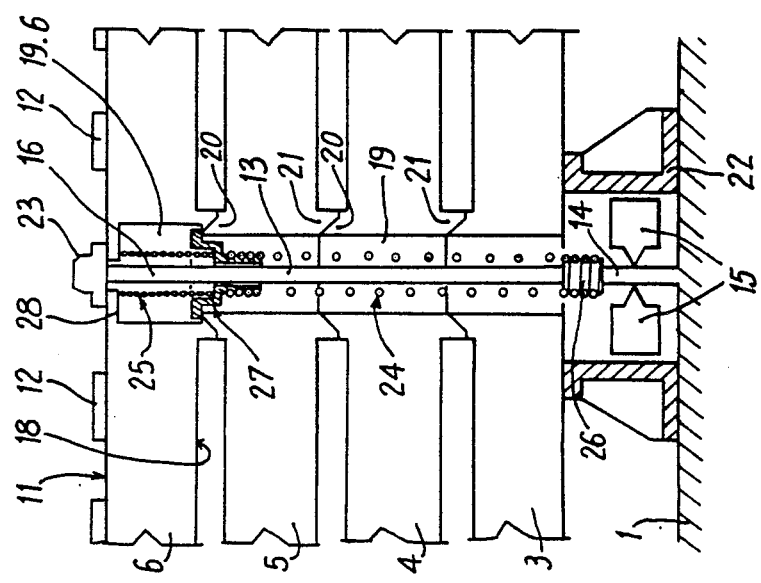

SYSTEM FOR SECURING AN ARTICULATED ASSEMBLY OF ELEMENTS ON A SPACECRAFT

FIELD OF THE INVENTION

The present invention relates to a system for securing an articulated assembly of elements on a spacecraft.

BACKGROUND OF THE INVENTION

Articulated assemblies of elements, such as solar generator panels, antennas, heat radiators, distance arms, etc . . . are known to be secured on spacecraft.

Upon launching of a spacecraft by a booster rocket, these elements, which may be panels of several square meters, made of light material, must be closely folded and applied against said craft and must be maintained in this position for the whole phase of launching and placing in orbit.

In order to maintain the elements folded, systems are necessary which, when ordered to, for example remotely controlled from Earth, release said elements and allow them to be deployed, without interfering with the kinematics of deployment.

As these elements may be larger than the structure of the craft, securing systems are used which comprise at least one retaining member passing through each element. However, such a through retaining member risks coming into contact with said elements at the moment of deployment and possibly deteriorating them.

In order to avoid these drawbacks, Patent DE-A-3 106 099 describes a system of the type mentioned above, making it possible outwardly to displace said retaining member, previously cut, so as to release it from said folded elements. The system of this prior Patent comprises, to that end, elastic drive means disposed between the outer element of the articulated assembly and said retaining member. In the folded position of said assembly of elements, said elastic drive means are taut, but prevented from relaxing thanks to said retaining member. On the other hand, as soon as the retaining member is broken, said elastic means relax and displace said retaining member and take and maintain it in a position for which it releases said elements (which may then be deployed without risk of contact with said member), but in which said elastic means and said retaining member project with respect to the outer face of said outer element.

This may result in drawbacks. In fact, when, for example, said elements are panels equipped with solar cells, said projecting elastic means and retaining member cast a shadow on said cells borne by the outer face of said outer element, with the result that the electric generator associated therewith cannot offer its maximum yield.

It is an object of the present invention to overcome these drawbacks.

SUMMARY OF THE INVENTION

To that end, according to the invention, the system for securing, in folded position, an assembly of articulated elements on one another and on a structure, and adapted to take either said folded position in which said elements are superposed, or a deployed position in which said elements are at least substantially aligned end to end, said system comprising:

at least one retaining member passing through said elements in folded position of said assembly and connected on one side to said structure and in abutment, on the other, on the outer element of said assembly;

means for voluntarily breaking either said retaining member or its connection to said structure, when it is desired to pass said assembly of elements from its folded position to its deployed position; and a mechanism comprising elastic drive means for drawing, outwardly of said assembly, through said outer element, the corresponding part of said retaining member after action of said breaking means, is noteworthy in that:

said mechanism comprises additional elastic drive means, of which the action is of opposite direction to that of said elastic drive means and is adapted to return and maintain said released retaining member in a position which, with respect to said outer element and at least when said assembly is in deployed position, is at least substantially the same as the one which said retaining member occupied in folded position of said assembly of elements before action of said breaking means; and said elastic drive means and said additional elastic drive means are disposed towards that face of said outer element directed, in folded position of said assembly, towards the other elements of the latter.

Any possibility of shadow on the solar cells cast by the outer face of the outer panel is thus eliminated.

In an advantageous embodiment, said mechanism comprises a piece adapted to slide along said retaining member, but maintained captive between the outer element and the adjacent element in folded position of said assembly of elements, and said elastic drive means and said additional elastic drive means abut on said piece.

Said elastic drive means are preferably of the draw spring type and in addition abut on the inner end of said retaining member, whilst said additional elastic drive means are of the extension spring type and in addition abut on said outer element. Said elastic drive means and said additional elastic drive means may be helical springs traversed by said retaining member.

The outer end of the retaining member is preferably provided with a stop element adapted to abut on the outer face of the outer element and advantageously adjustable.

As will follow from the following description, for operation of the system according to the invention to be optimum, it is preferable if:

the force of traction of the elastic drive means is greater than the force of extension of the additional elastic drive means;

the action of traction of the elastic drive means is rapid with respect to the deployment of said elements; and the action of extension of the additional elastic drive means is slow with respect to the deployment of said elements.

BRIEF DESCRIPTION OF THE DRAWINGS

The invention will be more readily understood on reading the following description with reference to the accompanying drawings, in which:

FIG. 1 schematically illustrates, in folded position, an assembly of solar panels mounted on a satellite, provided with the known securing system of the type concerned by the present invention.

FIG. 2 schematically shows, in deployed position, the assembly of the solar panels of FIG. 1.

FIG. 3 schematically shows, in deployed position and in a view similar to FIG. 2, the assembly of the solar panels of FIG. 1, in the case of said known securing system being replaced by the securing system according to the present invention.

FIG. 4 shows, in folded position of the panels and on a larger scale, an embodiment according to the invention of the system for securing said assembly of solar panels.

FIG. 5 illustrates, in a view similar to FIG. 4, the beginning of deployment of said solar panels, just after break of the retaining member.

FIG. 6 illustrates the final position of said retaining member with respect to the outer panel of said assembly of panels.

DETAILED DESCRIPTION OF THE DRAWINGS

Referring now to the drawings, the artificial satellite 1 shown in FIG. 1 is equipped with at least one assembly 2 of solar panels 3, 4, 5 and 6 occupying a position folded zigzag-wise with respect to the structure of the satellite 1 and locked in this position by means of a securing system.

The inner panel 3 is connected in rotation, by one of its lateral edges, to the structure of the satellite 1 by an articulation 7, whilst the lateral edge of said panel 3, opposite the preceding one, is connected, by an articulation 8, to the adjacent panel 4. This latter is also connected by an articulation 9 to panel 5 which, in turn, is connected to the outer panel 6 of the assembly by an articulation 10. In their folded position, the panels 3 to 6 thus form a pile. Each panel bears solar cells, of which only those borne by the outer face 11 of the outer panel 6 are schematically shown by broken lines referenced 12.

The number and shape of the panels, as well as the connection of the first panel with the structure of the satellite may, of course, be different; the same applies to the number of assemblies 2 of solar panels arranged on the satellite.

The system for retaining the assembly 2 of solar panels 3 to 6, in folded position, comprises at least one retaining member 13, passing through said panels and connected on one side, at its end 14, to voluntary break means 15 fixed to the structure of the satellite and, on the other side, at its other end 16, to the outer face 11 of the outer solar panel 6.

The voluntary break means 15 are, for example, of the pyrotechnic type and, when they are actuated, are capable of disconnecting the retaining member 13 from the satellite 1, thus allowing passage of the assembly 2 of the solar panels from the folded position (FIG. 1) to the deployed position (FIG. 2 or FIG. 3), for example spontaneously under the action of springs incorporated in the articulations 7 to 10 and not specifically shown.

In known manner, the securing system comprises, in addition, a mechanism 17 with elastic drive means for drawing, through the outer solar panel 6, the retaining member 13 after action of the pyrotechnic break means 15, the mechanism 17 being connected to the end 16 of the retaining member 13 and disposed towards the outer face 11 of the outer panel 6. Thanks to the outward traction of the retaining member 13, which is for example a rigid spindle, said retaining member 13 does not deteriorate the panels 3 to 6 when the latter pass from their folded position to their deployed position.

As may be seen in FIGS. 2 and 3, in the deployed position of the assembly 2, the solar panels 3 to 6 are substantially aligned end to end, after actuation of the pyrotechnic break means 15, which disconnect the retaining member 13 from the structure of the satellite 1.

From that moment, the mechanism 17 incorporating elastic drive means, previously stretched when the assembly 2 of the solar panels is in folded position, releases its energy and relaxes, resuming its relaxed state, drawing the retaining member 13 by the end 16 towards the outside of the outer panel 6, in a remote position with respect to the satellite. From the break of the connection between the member 13 and the satellite 1, the solar panels 3, 4, 5 and 6 may be deployed about their respective articulations, for example under the action of the elastic means incorporated in said articulations, being arranged substantially end to end.

As schematically illustrated in FIG. 2, in the known securing systems, when the mechanism 17 attains its relaxed state, it immobilizes the retaining member 13 opposite the outer face 11 of the outer solar panel 6. This therefore results in said retaining member 13 and said mechanism 17 projecting outwardly with respect to the outer face 11 of the outer panel 6 and casting a shadow on the solar cells 12 mounted on this outer face 11. The yield of the solar generator, of which said cells 12 form part, is therefore not optimum.

In order to avoid this drawback, the present invention provides that, at least in final position, the retaining member 13 and the mechanism 17 be located towards the inner face 18 of the outer panel 6 (cf. FIG. 3).

An embodiment according to the invention of the system for securing the assembly of solar panels is illustrated in FIGS. 4, 5 and 6. These Figures correspond respectively to a folded position of the panels, the latter being for example parallel to the longitudinal axis of the satellite 1, to a position corresponding to the beginning of deployment of the panels, and to a deployed position of the panels, the latter then for example being at right angles to the longitudinal axis of the satellite.

In this embodiment, the retaining member 13, such as, for example, a rod or tie-rod, is found again, of which the inner end 14 is fast with the structure of the satellite 1 and is disposed opposite break means 15, for example of pyrotechnic type, likewise fast with the structure of the satellite.

Passages, of which each traverses a panel 3 to 6, form by juxtaposition, in folded position of said panels, a continuous passage 19 for said retaining member 13 therethrough. A system of cooperating stops 20, 21 fix the distance of the panels of the pile thus constituted. A stop 22 fast with the satellite structure 1 serves as support for the assembly of panels 3 to 6. At the outer end 16 of the retaining member 13, there is provided a stop element 23 in abutment on the outer face 11 of the outer panel 6. It is thus seen that the cooperation of the retaining member 13, the stops 20, 21 and 22 and of the stop element 23 makes it possible, when the panels 3 to 6 are in folded position, rigidly to maintain not only the latter together but also with respect to the satellite 1. To that end, it may be advantageous if the stop element 23 is constituted by a nut screwing on the rod 13 in order to be able to exert an adjustable tightening, possibly via elastic washers (not shown), on the folded assembly of panels 3 to 6.

According to the invention, the mechanism for driving the retaining member 13 is constituted in this embodiment by two helical springs 24 and 25.

The spring 24 performs the role of the mechanism 17 described hereinabove, but is disposed in the passage 19, i.e. towards the inner face 18 of the outer panels 6, and not towards the outer face 11 of the latter, like mechanism 17. The spring 24 surrounds the retaining member 13 and one of its ends is rendered fast, at 26, with the inner end 14 thereof, the break means 15 being located between the structure of the satellite 1 and said point of connection 26. The other end of the spring 24 is fast with a dish 27 adapted to slide along the retaining member 13 and maintained between the outer panel 6 and the adjacent panel 5, when said assembly of panels 3 to 6 is in folded position (cf. FIG. 4). The spring 24 is a draw spring and, when said panels are in folded position, it is taut.

Similarly, spring 25 surrounds the retaining member 13. Its inner end is in abutment in the dish 27 and its outer end abuts on the outer panel 6. Spring 25 is housed in part 19.6 of the passage 19 disposed in panel 6 and its outer end abuts on a shoulder 28 provided in this part 19.6. Spring 25 is an extension spring and, when the panels 3 to 6 are in folded position, it is compressed.

Furthermore, springs 24 and 25 are chosen so that the force of traction of spring 24 is greater than the force of extension of spring 25.

When it is desired to obtain deployment of panels 3 to 6, the break means 15 are actuated, which cut the retaining member 13, between the structure of the satellite 1 and the point of connection 26 of the draw spring 24 on said retaining member 13. Consequently, the draw spring 24 relaxes and draws said retaining member 13 through the panels 3 to 6, with the result that the latter projects outside the outer face 11 of the outer panel 6. The force of spring 24 is chosen so that the traction of the retaining member 13 is rapid (cf. FIG. 5).

Deployment of the panels 3 to 6 may then take place either at random or in synchronized manner. It will be noted that, as long as panels 6 and 5 remain in contact after break of the member 13, the spring 25 remains taut, since the dish 27 is maintained therebetween. On the other hand, as soon as panels 5 and 6 are spaced apart from each other, the dish 27 is released and the spring 25 may relax. The retaining member 13 is then pushed by said spring 25 in direction opposite the traction to which the relaxing of the spring 24 had subjected it and it resumes, with respect to the outer panel 6, its initial position for which the stop element 23 is in abutment on the outer face 11 of the outer panel 6 (cf. FIG. 6). The force of spring 25 is chosen so that the thrust of the retaining member 13 is slow with respect to the distance of the panels 5 and 6, so that said member does not come into contact with said panel 5, during deployment of said panels 3 to 6.

What is claimed is:

1. In a system for securing, in folded position, an assembly of articulated elements on one another and on a structure, and adapted to take either said folded position in which said elements are superposed, or a deployed position in which said elements are at least substantially aligned end to end, said system comprising:
   at least one retaining member passing through said elements in folded position of said assembly and connected on one side to said structure and in abutment, on the other side, on the outer element of said assembly;
   means for voluntarily breaking either said retaining member or its connection to said structure, when it is desired to pass said assembly of elements from its folded position to its deployed position; and
   a mechanism comprising elastic drive means for drawing, outwardly of said assembly, through said outer element, the corresponding part of said retaining member after action of said breaking means, wherein the improvement comprises:
   said mechanism comprises additional elastic drive means, of which the action is of opposite direction to that of said elastic drive means and is adapted to return and maintain said released retaining member in a position which, with respect to said outer element and at least when said assembly is in deployed position, is at least substantially the same as the one which said retaining member occupied in folded position of said assembly of elements before action of said breaking means; and
   said elastic drive means and said additional elastic drive means are disposed towards that face of said outer element directed, in folded position of said assembly, towards the other elements of the latter.

2. The securing system of claim 1, wherein said mechanism comprises a piece adapted to slide along said retaining member, but maintained captive between the outer element and the adjacent element in folded position of said assembly of elements, and said elastic drive means and said additional elastic drive means abut on said piece.

3. The securing system of claim 2, wherein said elastic drive means are of the draw spring type and in addition abut on the inner end of said retaining member, whilst said additional elastic drive means are of the extension spring type and in addition abut on said outer element.

4. The system of claim 2, wherein said elastic drive means and said additional elastic drive means are helical springs traversed by said retaining member.

5. The system of claim 1, wherein the outer end of the retaining member is provided with a stop element adapted to abut on the outer face of the outer element.

6. The system of claim 5, wherein said stop element is adjustable.

7. The system of claim 3, wherein the force of traction of the elastic drive means is greater than the force of extension of the additional elastic drive means.

8. The system of claim 3, wherein the action of traction of the elastic drive means is rapid with respect to the deployment of said elements.

9. The system of claim 3, wherein the action of extension of the additional elastic drive means is slow with respect to the deployment of said elements.

10. The system of claim 1, wherein it is employed for securing solar panels of a photovoltaic array.

* * * * *